(12) United States Patent
Mondello et al.

(10) Patent No.: US 10,778,661 B2
(45) Date of Patent: Sep. 15, 2020

(54) SECURE DISTRIBUTION OF SECRET KEY USING A MONOTONIC COUNTER

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 239 days.

(21) Appl. No.: 15/965,731

(22) Filed: Apr. 27, 2018

(65) Prior Publication Data

US 2019/0334882 A1    Oct. 31, 2019

(51) Int. Cl.
*H04L 29/06* (2006.01)
*G06F 21/78* (2013.01)
*H04L 9/08* (2006.01)

(52) U.S. Cl.
CPC ............ *H04L 63/062* (2013.01); *G06F 21/78* (2013.01); *H04L 9/0866* (2013.01); *H04L 9/0894* (2013.01)

(58) Field of Classification Search
CPC ... H04L 63/062; H04L 9/0866; H04L 9/0894; G06F 21/78
See application file for complete search history.

(56) References Cited

U.S. PATENT DOCUMENTS

| | | | |
|---|---|---|---|
| 7,934,049 B2 | 4/2011 | Holtzman et al. | |
| 8,068,614 B2 | 11/2011 | Kumar et al. | |
| 9,049,005 B2 | 6/2015 | Cho et al. | |
| 9,489,540 B2 | 11/2016 | Lee et al. | |
| 9,563,774 B1 | 2/2017 | Litvin | |
| 9,858,208 B2 | 1/2018 | Connolly et al. | |
| 2003/0033175 A1 | 2/2003 | Ogura et al. | |
| 2004/0249663 A1 | 12/2004 | Shishido | |
| 2007/0300207 A1 | 12/2007 | Booth et al. | |
| 2008/0148061 A1 | 6/2008 | Jin et al. | |

(Continued)

FOREIGN PATENT DOCUMENTS

WO    WO2017144586 A1 *  2/2017  ............. G06F 21/10

OTHER PUBLICATIONS

International Search Report and Written Opinion, PCT/US2018/063641, dated Jun. 27, 2019.

(Continued)

*Primary Examiner* — Paul E Callahan
(74) *Attorney, Agent, or Firm* — Greenberg Traurig

(57) ABSTRACT

A system includes non-volatile memory that stores a key to be securely shared. A monotonic counter of the system provides counter value outputs including an initial value at initialization, and an output value later read from the monotonic counter. The system generates the key, and stores the key in the non-volatile memory. The system initializes the monotonic counter to provide the initial value, wherein the initial value is associated with the stored key; and sends, to another computing device, a communication including the initial value. The other computing device compares the output value later read from the monotonic counter to the initial value to determine whether tampering with the system has occurred (e.g., an improper key access attempt made after the initialization). In one approach, one or more secret keys can be shared/used by using one or more monotonic counters.

17 Claims, 5 Drawing Sheets

(56) References Cited

U.S. PATENT DOCUMENTS

| | | |
|---|---|---|
| 2009/0222672 A1 | 9/2009 | Clarke et al. |
| 2010/0228997 A1 | 9/2010 | Cheng et al. |
| 2010/0241841 A1 | 9/2010 | Buer |
| 2010/0313056 A1 | 12/2010 | Margolis et al. |
| 2011/0191837 A1 | 8/2011 | Guajardo Merchan et al. |
| 2013/0047144 A1 | 2/2013 | Chalmers et al. |
| 2013/0185548 A1 | 7/2013 | Djabarov et al. |
| 2013/0279689 A1 | 10/2013 | Obaidi |
| 2014/0032933 A1 | 1/2014 | Smith et al. |
| 2014/0108786 A1 | 4/2014 | Kreft |
| 2015/0012737 A1 | 1/2015 | Newell |
| 2015/0038090 A1 | 2/2015 | Chang |
| 2015/0092939 A1 | 4/2015 | Gotze et al. |
| 2015/0348179 A1 | 12/2015 | Kamisawa |
| 2016/0055068 A1 | 2/2016 | Jeansonne et al. |
| 2016/0128016 A1 | 5/2016 | Avary et al. |
| 2016/0357963 A1 | 12/2016 | Sherman |
| 2017/0017808 A1 | 1/2017 | Kwong et al. |
| 2017/0109533 A1 | 4/2017 | Shah et al. |
| 2017/0126414 A1 | 5/2017 | Goel et al. |
| 2018/0373598 A1 | 12/2018 | Mondello et al. |
| 2019/0199525 A1 | 6/2019 | Mondello et al. |
| 2019/0202399 A1 | 7/2019 | Troia et al. |
| 2019/0221139 A1 | 7/2019 | Schrijen et al. |
| 2019/0229913 A1 | 7/2019 | Fava et al. |
| 2019/0372964 A1 * | 12/2019 | Newton .............. H04L 63/0823 |

OTHER PUBLICATIONS

Emmanuel Owusu, et al.: "OASIS: on achieving a sanctuary for integrity and secrecy on untrusted platforms", CCS'13 Proceedings of the 2013 ACM SIGSAC conference on Computer & communications security, Nov. 8, 2013. See sections 4, 6.2.

International Search Report and Written Opinion, PCT/US2018/063143, dated Mar. 12, 2019.

International Search Report and Written Opinion, PCT/US2018/068132, dated May 1, 2019.

International Search Report and Written Opinion, PCT/US2019/028303, dated Aug. 6, 2019.

* cited by examiner

SECURE DISTRIBUTION OF SECRET KEY USING A MONOTONIC COUNTER

FIELD OF THE TECHNOLOGY

At least some embodiments disclosed herein relate in general to security, and more particularly, but not limited to, secure distribution of a key.

BACKGROUND

In the field of cryptography, symmetric-key algorithms use the same cryptographic keys for both encryption and decryption. The keys may be identical or related by a transformation between the two keys. The keys are a shared secret between two or more parties that can be used for secure communications.

Symmetric-key algorithms require both a sender and a recipient of a message to have the same secret key. Early cryptographic systems required one of the parties to receive a copy of the secret key over a physically-secure channel.

Modern cryptographic systems use symmetric-key algorithms to encrypt messages. Symmetric-key algorithms are also used to offer, for example, authentication services, message integrity services, data integrity services, which are all based on use of a secret key in conjunction with a MAC (Message Authentication Code) algorithm. Examples of MAC algorithms include HMAC-SHA256, PMAX, CMAC, MAA, etc). In some cases, a Diffie-Hellman key exchange or some other public-key protocol is used to securely agree on a fresh new secret key for each message.

When used with asymmetric ciphers for key transfer, pseudorandom key generators are typically used to generate the public and private keys needed for the asymmetric transfer of the secret key. However, lack of randomness in those generators can lead to problems (e.g., a security breach). Typically, it is desirable that an implementation use a source of high entropy for its initialization.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
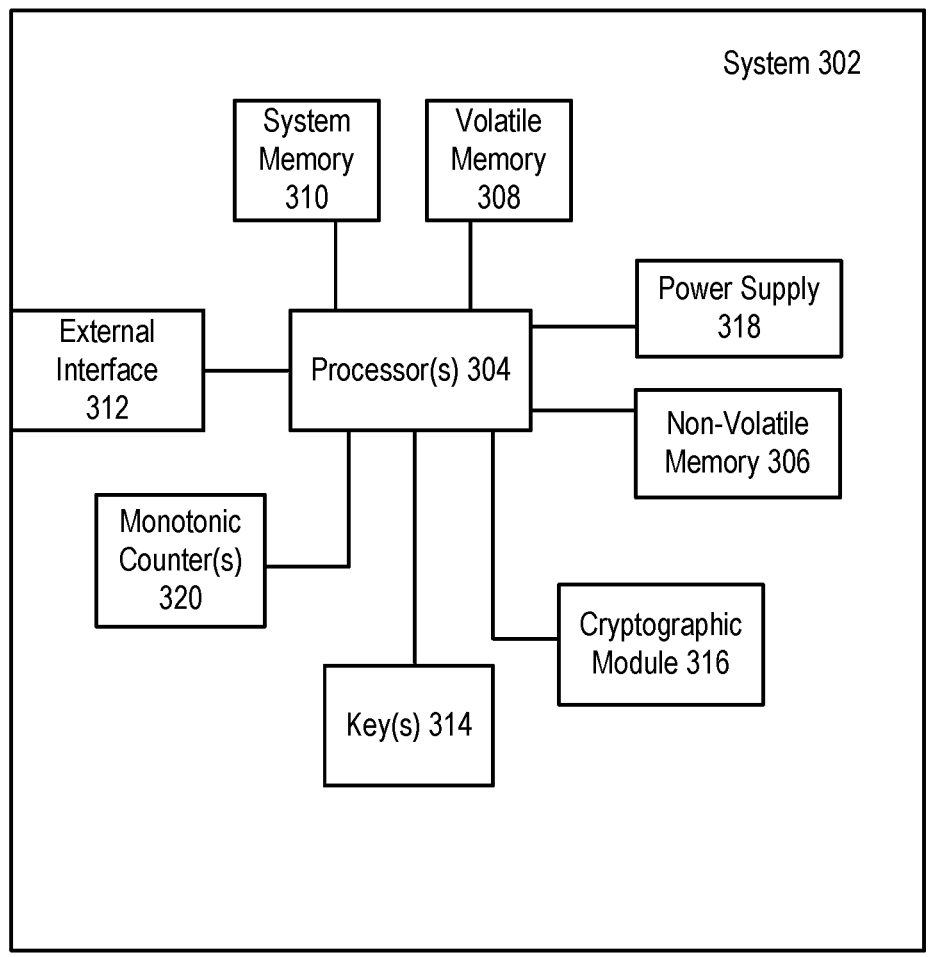
FIG. 1 shows a system that sends an initial value provided by a monotonic counter of the system for use in determining whether tampering with the system has occurred, according to one embodiment.

It desired to reduce the production costs of devices with cryptographic capabilities. For example, it is desired to simplify the production flow and, at the same time, maintain the same level of security performance of the devices.

One of the production steps that is expensive for a device/board manufacturer is the key injection step. For example, key injection involves programming a unique and secret key for each die or other device. It is desired that key injection is done in a secure environment (e.g., a secure production facility) to avoid leaking one or more keys to an unauthorized person or device.

Also, end users that receive systems in which a key is injected desire that it is not possible for a hacker to do a read access to obtain the key after it has been injected during production (e.g., end users want to prevent key hacking). Sometimes, end users request that the procedures above are certified/executed by a third party infrastructure. However, the use of a third party infrastructure is expensive.

Various embodiments below provide a way to solve the above technical problems. In many cases, the circuitry used already exists on the device (e.g., as used for other processing of the device). Further, a third party infrastructure is not needed. In addition, the various embodiments may provide an end user with additional features that are useful to implement an on-field mechanism for securing information and monitoring usage of a device or board after receipt by the end user.

At least some embodiments disclosed herein relate to a system that uses a secret key for secure communication with other devices. The secret key is generated and stored on the system (e.g., by key injection at the factory after initial assembly of a system board). A monotonic counter of the system is used to provide an initial value.

In one embodiment, the initial value is sent by electronic communication to an intended recipient of the physical system (e.g., the recipient will receive the physical system after it is physically transported to the recipient's location). After receiving the system, the recipient reads an output value from the monotonic counter. The recipient (e.g., using a computing device or server of the recipient that earlier received the initial value) compares the initial value and the output value to determine whether tampering has occurred with the system. In one example, the tampering is an unauthorized attempt by an intruder to access the secret key of the system during its physical transport.

In one embodiment, a secret key can be generated, for instance, using a true RNG (random number generator) or a PUF, or previously injected in the system (memory) in a secure environment like a factory.

In one embodiment, the generated key is associated with the initial value of the monotonic counter. The initial value is used by a recipient of the system to determine whether an unauthorized attempt has been made to access the stored key. In one embodiment, a key injection process can use an output from a physical unclonable function (PUF) to generate the key for every power-on cycle of a computing device that stores the key.

One aspect of the present embodiments includes the realization that security is desirable for numerous types of computing devices, including system boards and other devices used in Internet of things (IoT) and autonomous vehicle implementations. A typical computing platform stores one or more secret keys. The platform may also further include one or more components equipped with volatile and/or non-volatile memory that contain run-time code and permanent code (e.g., firmware).

In one embodiment, it is desired that all devices or components of a platform have a mechanism to ensure that an unauthorized tampering (e.g., attempt to access the secret key on a system and/or corrupt or change code) is recognized and fixed. The failure to detect an unauthorized access and/or code change may lead to a dangerous or destructive unauthorized function or operation of one or more of the components. Various embodiments below solve this problem by using values provided by a monotonic counter of the system to determine whether tampering has occurred.

In one embodiment, one or more initial values from a monotonic counter(s) of a manufactured system are communicated (e.g., by electronic communication using a server) from a sender (e.g., a manufacturer of a system board) to a receiver (e.g., a computing device of an end user). The sent initial values are the values that the receiver expects to read from the monotonic counter after receiving the system (e.g., read at the physical location of the receiver after the system board has been shipped and received by the recipient).

After receipt, the receiver reads an output value(s) from the monotonic counter(s) after the receiver has powered-on the system/device. The receiver adjusts the expected initial value by subtracting the receiver's known power-on and key access operations from the output value read from the monotonic counter(s). The adjusted initial value is compared to the read output value. If there is a match, then the system is considered secure (and that no tampering has occurred). If the adjusted initial value and output value (for each respective monotonic counter) do not match, then tampering is determined to have occurred (e.g., the receiver does not find a match to the expected value communicated by the sender, and the receiver deems the system/device to be compromised).

FIG. 1 shows a system 302 that sends an initial value provided by a monotonic counter 320 for use in determining whether tampering with system 302 has occurred, according to one embodiment. For example, it can be determined whether system 302 has been tampered with by a hacker seeking unauthorized access to a stored key during physical transport of system 302. In one example, system 302 is a system board that includes nonvolatile memory 306, processor(s) 304, monotonic counter(s) 320, and power supply 318.

One or more keys 314 are generated under control of processor 304. Nonvolatile memory 306 is used to store the generated keys. Nonvolatile memory 306 is, for example, a nonvolatile memory device (e.g., 3D cross point storage)

Monotonic counter 320 is initialized to provide an initial value. This initial value is associated with the stored key 314. The initial value is sent by a processor 304 via external interface 312 to another computing device. For example, the initial value can be sent to a server of the receiver to which system 302 will be shipped after manufacture and key injection is completed.

When system 302 is received by the receiver, a computing device of the receiver determines the initial value. For example, the computing device can store in memory the initial value received when sent as described above. The computing device reads an output value from the monotonic counter 320. This output value is compared to the initial value to determine whether there has been tampering with the system 302.

In one embodiment, the computing device of the receiver determines a number of events that have occurred that cause the monotonic counter 302 to increment. For example, the output values from monotonic counter 302 can be configured to increment on each power-on operation of system 302 (e.g., as detected by monitoring power supply 318). The output values from monotonic counter 302 can be additionally and/or alternatively configured to increment on each attempt to perform a read access of the stored key 314.

By keeping track, for example, of the number of known events that cause the monotonic counter to increment, the initial value received from the sender can be adjusted based on this number of known events. Then, the adjusted initial value is compared to the output value read from monotonic counter 302. If the values match, then no tampering has occurred. If the values do not match, the computing device determines that tampering has been detected.

In response to determining that tampering has been detected, one or more functions of system 302 can be disabled. In one embodiment, processor 304 receives a communication from the computing device of the receiver that includes an indication that tampering has been detected. In response receiving the communication, processor 304 disables at least one function of system 302. In one example, the function disabled is read access to the stored key 314.

In one embodiment, system 302 can be configured so that a counter value output from monotonic counter 320 cannot exceed a predetermined maximum value. For example, when each counter value is read from monotonic counter 320, a determination is made whether the counter value exceeds a predetermined maximum value. If the counter value exceeds the predetermined maximum value, read access to stored key 314 can be permanently disabled (e.g., under control of processor 304).

In one embodiment, system 302 is embodied on a semiconductor die. In another embodiment, system 302 is formed on a system board. An application is stored in system memory 310 and executed by processor 304. Execution of the application occurs after power-on of the system 302. For example, the receiver of the system 302 can execute the application after determining that no tampering has occurred with the system.

In one embodiment, key 314 is generated using an output value from one or more physical unclonable functions (PUFs). For example, the keys are generated for each power-on cycle of system 302.

In one embodiment, system 302 is a controller that stores key 314. The external interface 312 is used to send an initial value from monotonic counter 320 to an external nonvolatile memory device (not shown) on the same system board as the controller. The external nonvolatile memory device determines whether tampering has occurred by reading an output value from monotonic counter 320 and comparing the output value to the initial value received from system 302.

In one embodiment, system memory 310 includes volatile memory 308 and/or nonvolatile memory 306. Cryptographic module 316 is used to perform cryptographic operations for secure communications over external interface 312 using keys 314 (e.g., symmetric keys).

Secret key sharing is now described in various further embodiments. A secure communication channel is setup by key sharing between the actors that participate in the communication. Components that are used in a trusted platform module board often do not have sufficient processing capability to implement schemes such as, for example, public key cryptography.

In one embodiment, one or more secret keys are shared between a device/board manufacturer and the OEM/final customers. Also, keys can be shared as needed between different devices in the same board in the field. One or more monotonic counters are used inside the secure device, as was discussed above.

In one example, before a device leaves the factory or the manufacturer testing line, one or more secret keys are injected inside the device (e.g., one or more secret keys as follows: $Secret\_Key_k$ with k=1, ..., N), depending on the device capability and user needs.

One or more monotonic counters are initialized (N (N≥1) different MTCs→$MTC_k$=0), depending on the device capability and user needs. The monotonic counters (MTCs) are configured to increment the output value any time the power-on of the system/device occurs and any time the stored secret key is (attempted) to be read.

The value of each $MTC_k$ can be public and shared with the customer (e.g., as $MTC_k$). A command sequence (e.g., as arbitrarily determined by the system designer) is used to read the key from the device, and the command sequence can be public (e.g., the strength of the method is not based on secrecy of read protocol).

In one embodiment, it is not required to use a dedicated MTC for each secret key. This can vary depending on the type of security service being used. For example, some keys can be read together, and they only need a single MTC.

In one embodiment, after arrival of the system at the receiver (e.g., customer/user) location, several operations are performed. A computing device of the receiver first determines the initial value(s) of the monotonic counter(s) 320. For example, the values of $MTC_k=(MTC_0)_k$ are retrieved (e.g., the initial values written and sent at the moment that the device leaves the factory). The $MTC_k$ values may be different for each MTC or associated key.

Then, the receiver customer/user powers on the system 302. The first addressed operation is the read of the $MTC_k$ values. If each $MTC_k$ value matches with the expected (received) initial value [e.g., $MTC_k=(MTC_0+1)_k$], then the device is determined as not having been powered on during physical shipping or other transfer, and the system 302 is considered authentic (and not tampered) by the end user/customer.

If one or more values do not match, then tampering has occurred. For example, an unauthorized person powered-up the device and attempted to read the stored keys. If tampering has occurred, the device is discarded and the indication of tampering communicated to the sender (e.g., transfer company) to avoid further technical security problems.

In another embodiment, multiple read operations are performed by the receiver of the system 302. For example, the device leaves the factory and arrives at the customer/OEM. The customer reads one or more keys and the related $MTC_k$ are incremented by one. If the $MTC_j$ incremented exceeds the value preset ($MTC_j$ MAX) by the silicon factory (sender), the read of the key ($Secret\_Key_j$) is permanently disabled.

In this example, the $MTC_j$ MAX is a predetermined maximum value agreed with by the sender and customer for each MTC. This methodology allows one or more attempts of key reading after/before reading of the MTC value can be checked or performed. This permits, for example, discovery of any un-authorized access and also at the same time ensures that the OEM/customer has a few times to perform reading of the keys before disablement.

If during the read process, one or more MTCs has an unexpected value (e.g., the initial value and read value do not match after adjustments for the number of known read and power-on operations), the device is discarded. In one embodiment, once all the keys are read, the related $MTC_k$ are cleaned-up and can be re-used for other purposes (e.g., cryptographic processing functions, etc., as configured and desired by the system designer).

In another example, device/board usage is monitored. This example uses monotonic counters that are already present on a secure device (e.g., present for use by cryptographic module 316). Before the device leaves the silicon factory, on the testing line the following is performed: Initialize M (M≥1) different MTC→$MTC_k$=0. Such MTC counters are incremented at each power-up of the device. Each counter can be initialized to zero (or to another initial value, if desired).

The receiver end user can use the received $MTC_k$ values to obtain various information regarding system 302 such as, for example: detection of unauthorized use of component/board, determining that a component has been desoldered and used outside the board to hack it, power cycle count to implement a fee mechanism based on a customer's services, device board warranty policies, and power loss.

In one embodiment, implementing the fee mechanism involves associating a value to a specific usage. An application can be provided to a customer, and the customer must pay a fee to unlock the specific usage.

In one embodiment, a secret key is shared between different devices on the same system board (e.g., shared in the field when being used by an end user). The key is shared by exchange between components on the same board (e.g., between processors).

In one embodiment, each of one or more monotonic counters (MTCk) is initialized by setting its initial value to zero. In one example, when setting MTCk=0, the MTCk is a counter associated with a specific key, indicated by the number k. MTCk=0 indicates that the initial value of the counter is zero. Each k indicates one of the counter numbers, which corresponds to the number of internal keys stored in the device. The value of each counter is stored in a non-volatile memory area of the device.

In one embodiment, a power-on (sometimes also referred to as a power-up) of the device is detected. The device includes internal circuitry to measure a value of the power supply. When the power supply exceeds a certain threshold, the circuitry triggers an internal signal to indicate the presence (detection) of the power-on event. This signal can cause incrementing of the monotonic counters.

In one embodiment, an attempt to read the secret key is detected. The counters (MTCk) are incremented each time that the power is detected (as mentioned above), and further each time that a command sequence to read the key is recognized by the device interface. Knowing the initial MTCk values, when the shipping of the device is done, permits the final receiver (e.g., end user/customer) of the device to know the device (and counter) status. So, if during transit, there was an attempt to power-on and/or read the device, this generates a variation in the counter value stored in each MTCk.

In one embodiment, a command sequence is used to read the key from the device. For example, the device has an external interface, that accepts commands from other computing components or devices. The key is available for reading until a maximum counter value is reached. In one example, the device has a sequence at the interface: Command (e.g., 0x9b)+Argument (0x34)+signature. The device understands that the key is to be read and provided at the output.

In one embodiment, after testing of the device (e.g., at the initial factory), the MTCk for each key will have a initial value from initialization. So, for example, if k=3, then: MTC0=20d, MTC1=25d, MTC2=10. The values MTC0, MTC1, MTC2 are sent/transmitted to the customer, as a set of initial values. When the device is received by customer, the customer uses a command sequence, to read the values. The customer (e.g., using a computing device) then determines if the device was compromised during the shipping. In one example, the monotonic counter values are read using the command sequence that was described above.

In one embodiment, a predetermined maximum counter value is preset. For example, the maximum value preset can be selected based on customer procedures. For example, assume that the customer wants to read the key 10 times. Also, assume that the MTCk are incrementing only when the power is turned on, and assume that there are two counters, MTC0 (associated with the power-on only) and MTC1 (associated with the key read command procedure only). After the factory testing, based on monitoring the MTC0 and MTC1 values, it is found: MTC0=30, MTC1=25. In one example, the internal threshold is set at 40 for MTC0 and at 35 for MTC1.

In one embodiment, the MTC associated with a key increments with power up and an attempt to read the key. Each time that one of the two events happen, the MTC increments.

In one embodiment, the monotonic counters are cleaned up after final reading of the stored keys (and optionally can be re-used for other processing on the device). The system designer can configure this as desired. Final reading is, for example, when the purpose of the MTC counting, as a detector of a malicious event, is no longer needed. This releases the counters as resources, which can be used for other purposes, or the counters can remain to count.

In one embodiment, the monotonic counter can be used to get various types of information such as a component being de-soldered, implementing a fee mechanism, implementing a warranty, etc. The counters can be used to monitor different types of occurrences because the incrementing of the counter value can be externally triggered.

In one embodiment, a multiple key read option is provided. In one example, for initialization of the MTC values (for MTCk associated with keys), the maximum thresholds are set to allow the read of each key by the receiver of the component and/or the final user. The multiple read option allows changing the threshold according to the maximum number of attempts to read a particular key (which may differ for each key).

In one embodiment, various types of devices can use the above methods. For example, a CPU or MCU typically has an internal hardware security module that is not accessible by outside access. In one example, there is a need to have the same keys (e.g., when a symmetric key approach is used) stored in devices or components in order to operate correctly. In such case, the CPU/MCU benefits from the distribution/sharing of the key to an authorized entity, device, or component. This sharing allows reading of the key (e.g., this sharing corresponds to the programming of a value in the MTCk threshold).

In one embodiment, the above methods are used for customer firmware injection. For example, the above methods allow storing critical content inside a device (e.g., application firmware) and implementing movement of the device in an un-secured environment (without compromising the integrity of the firmware/device). In one example, for firmware injection, an unexpected change of the MTCk counter value during transport is used as an index to indicate that firmware compromise has occurred.

Figure 2:
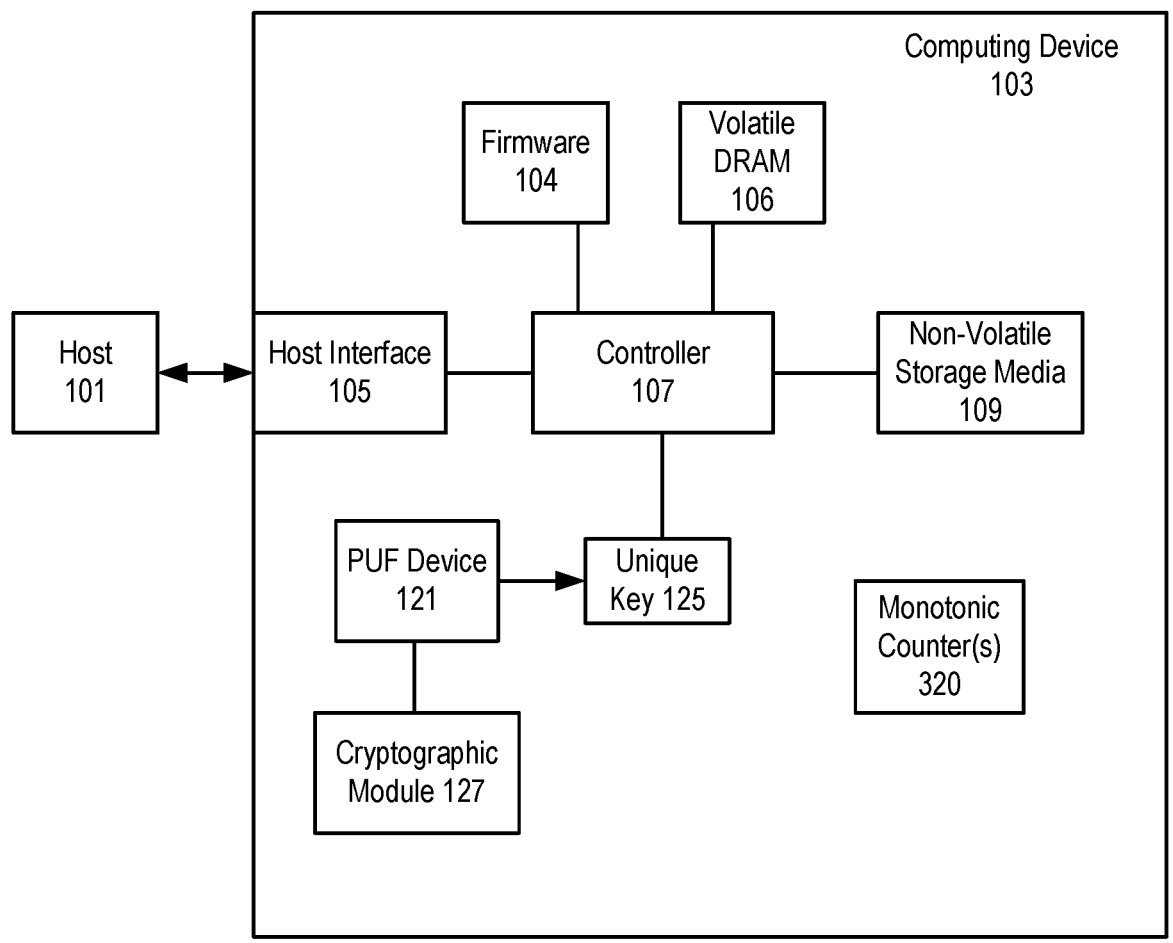
FIG. 2 shows a computing device using a PUF device to generate a key, according to one embodiment. In other cases, a key can be injected directly in a secure environment like a factory.

FIG. 2 shows a computing device 103 using a PUF device 121 to generate a key 125, according to one embodiment. In other cases, a key can be injected directly in a secure environment like a factory. An initial value can be initialized for one of monotonic counters 320, and the initial value can be associated to key 125, as was discussed above. A host 101 can communicate with the computing device 103 via a communication channel. Initial values for monotonic counters 320 can be sent to host 101, as discussed above. In addition, PUF device 121 is coupled to cryptographic module 127.

The host 101 can be a computer having one or more Central Processing Units (CPUs) to which computer peripheral devices, such as the computing device 103, may be attached via an interconnect, such as a computer bus (e.g., Peripheral Component Interconnect (PCI), PCI eXtended (PCI-X), PCI Express (PCIe)), a communication portion, and/or a computer network.

The computing device 103 can be used to store data for the host 101, for example, in the non-volatile storage media 109 (e.g., monotonic counter values can be stored). Examples of memory devices in general include hard disk drives (HDDs), solid state drives (SSDs), flash memory, dynamic random-access memory, magnetic tapes, network attached storage device, etc. The computing device 103 has a host interface 105 that implements communications with the host 101 using the communication channel. For example, the communication channel between the host 101 and the computing device 103 is a Peripheral Component Interconnect Express (PCI Express or PCIe) bus in one embodiment; and the host 101 and the computing device 103 communicate with each other using NVMe protocol (Non-Volatile Memory Host Controller Interface Specification (NVM-HCI), also known as NVM Express (NVMe)).

In some implementations, the communication channel between the host 101 and the computing device 103 includes a computer network, such as a local area network, a wireless local area network, a wireless personal area network, a cellular communications network, a broadband high-speed always-connected wireless communication connection (e.g., a current or future generation of mobile network link); and the host 101 and the computing device 103 can be configured to communicate with each other using data storage management and usage commands similar to those in NVMe protocol.

The controller 107 can run firmware 104 to perform operations responsive to the communications from the host 101, and/or other operations. Firmware in general is a type of computer program that provides control, monitoring and data manipulation of engineered computing devices. In FIG. 2, the firmware 104 controls the operations of the controller 107 in operating the computing device 103.

The computing device 103 has non-volatile storage media 109, such as magnetic material coated on rigid disks, and/or memory cells in an integrated circuit. The storage media 109 is non-volatile in that no power is required to maintain the data/information stored in the non-volatile storage media 109, which data/information can be retrieved after the non-volatile storage media 109 is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media 109 is non-volatile and can retain data stored therein without power for days, months, and/or years.

The computing device 103 includes volatile Dynamic Random-Access Memory (DRAM) 106 for the storage of run-time data and instructions used by the controller 107 to improve the computation performance of the controller 107 and/or provide buffers for data transferred between the host 101 and the non-volatile storage media 109. DRAM 106 is volatile in that it requires power to maintain the data/ information stored therein, which data/information is lost immediately or rapidly when the power is interrupted.

Volatile DRAM 106 typically has less latency than non-volatile storage media 109, but loses its data quickly when power is removed. Thus, it is advantageous to use the volatile DRAM 106 to temporarily store instructions and data used for the controller 107 in its current computing task to improve performance. In some instances, the volatile DRAM 106 is replaced with volatile Static Random-Access Memory (SRAM) that uses less power than DRAM in some applications. When the non-volatile storage media 109 has data access performance (e.g., in latency, read/write speed) comparable to volatile DRAM 106, the volatile DRAM 106 can be eliminated; and the controller 107 can perform computing by operating on the non-volatile storage media 109 for instructions and data instead of operating on the volatile DRAM 106.

In some instances, the controller 107 has in-processor cache memory with data access performance that is better than the volatile DRAM 106 and/or the non-volatile storage media 109. Thus, it is preferred to cache parts of instructions and data used in the current computing task in the in-processor cache memory of the controller 107 during the computing operations of the controller 107. In some instances, the controller 107 has multiple processors, each having its own in-processor cache memory.

Optionally, the controller 107 performs data intensive, in-memory processing using data and/or instructions organized in the computing device 103. For example, in response to a request from the host 101, the controller 107 performs a real-time analysis of a set of data stored in the computing device 103 and communicates a reduced data set to the host 101 as a response.

In some implementations, the processors of the controller 107 are integrated with memory (e.g., 106 or 109) in computer chip fabrication to enable processing in memory. The integration of processing and memory increases processing speed and memory transfer rate, and decreases latency and power usage.

At least some embodiments disclosed herein can be implemented using computer instructions executed by the controller 107, such as the firmware 104. In some instances, hardware circuits can be used to implement at least some of the functions of the firmware 104. The firmware 104 can be initially stored in the non-volatile storage media 109, or another non-volatile device, and loaded into the volatile DRAM 106 and/or the in-processor cache memory for execution by the controller 107.

Figure 3:
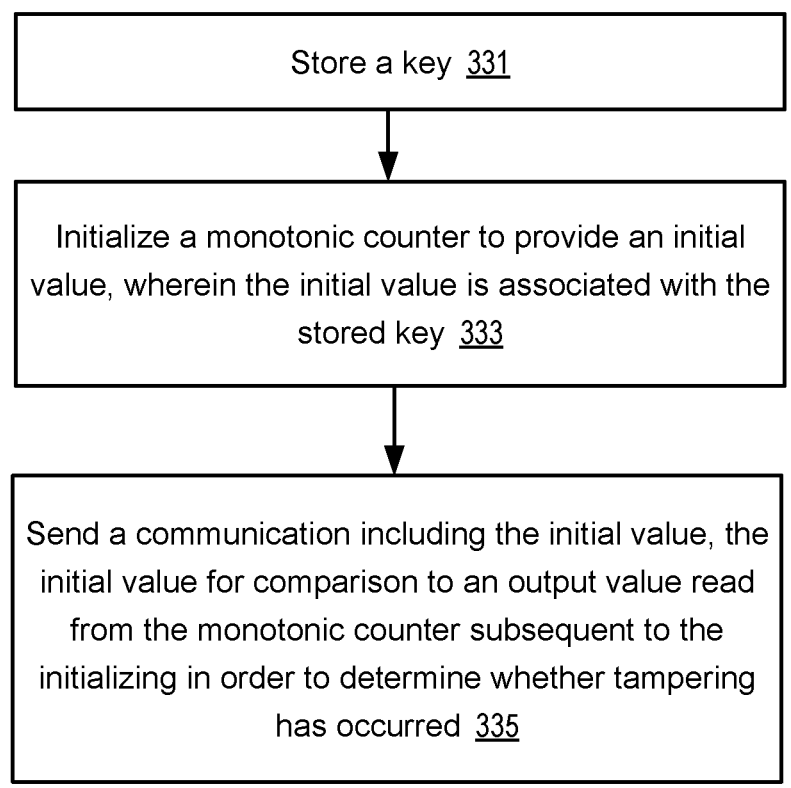
FIG. 3 shows a method for determining whether tampering has occurred based on a comparison of initial and subsequent values from one or more monotonic counters, according to one embodiment.

FIG. 3 shows a method for determining whether tampering has occurred based on a comparison of initial and subsequent values from one or more monotonic counters (e.g., monotonic counter 320), according to one embodiment. In block 331, a key is stored. For example, the key can be stored in system 302 or computing device 103.

In block 333, a monotonic counter is initialized to provide an initial value. The initial value is associated with the stored key.

In block 335, a communication is sent (e.g., to host 101) that includes the initial value. The initial value is used for comparison to an output value that is read from the monotonic counter subsequent to its initialization. This comparison is used to determine whether tampering has occurred with the device in which the key is stored.

In one embodiment, a method begins by storing a generated key on a system board. Monotonic counter values are initialized to provide initial values. The initial values are sent by electronic communication to a computing device of the intended receiver of the system board. For example, the receiver is a final customer. The receiver stores the initial values in memory of a computing device for later comparison when the system board is received.

Then, the system board is physically shipped or otherwise transferred to the receiver. When the system board is received by the final customer, the board is considered authentic if the monotonic counter values read or equal to the initial values communicated from the factory, after making adjustment for known operations that cause incrementing of the monotonic counter.

In another embodiment, multiple key reads are performed in the method. First, the generated key is stored in memory of the system board. The monotonic counter values are initialized. A predetermined maximum number of attempts to read the internal keys is defined. Then, the initial counter values are communicated to the final customer.

Next, the system board is delivered (e.g., shipped) to the final customer. The board is considered authentic if the MTC value read is equal to the initial value earlier received (communicated from the factory). The customer reads the stored keys and the internal associated MTC is incremented. In one embodiment, the read operation is forbidden when the value of the internal MTC reaches the defined maximum number of attempts above.

In some examples, a memory or other device can securely share secret keys between: silicon factory and customers; or secure places with non-secure moving that occurs between the factory and the customers. Also, secure moving of wafers between different plants can be performed after secure information is injected inside the devices (e.g., keys, and/or customer firmware). For example, this can be implemented to move wafers from the factory to an assembly location by physical transport (e.g., in which actual possession of the devices is given to unknown third parties during transport or other handling).

In one embodiment, a method comprises: storing a key; initializing a monotonic counter to provide an initial value, wherein the initial value is associated with the stored key; and sending a communication including the initial value, the initial value for comparison to an output value read from the monotonic counter subsequent to the initializing in order to determine whether tampering has occurred.

In one embodiment, the key is stored in a first component of a system board, the communication is sent to a second component of the system board, and the output value is read by the second component to determine whether the tampering has occurred. In one embodiment, the first component is a non-volatile memory device and the second component is a controller. In one embodiment, the tampering is an unauthorized attempt to read the stored key.

In one embodiment, the method further comprises, after sending the communication: reading the output value from the monotonic counter; comparing the output value to the initial value; and based on comparing the output value to the initial value, determining that tampering has occurred.

In one embodiment, the method further comprises counting a number of read operations performed to access the stored key, wherein comparing the output value to the initial value comprises adjusting the initial value based on the number of read operations.

In one embodiment, the method further comprises counting a number of power-on operations performed, wherein comparing the output value to the initial value further comprises adjusting the initial value further based on the number of power-on operations.

In one embodiment, the method further comprises: based on comparing the output value to the initial value, determining an absence of tampering; and in response to determining the absence of tampering, reading the stored key.

In one embodiment, a system comprises: non-volatile memory configured to store a key; a monotonic counter configured to provide a counter value output, wherein the counter value output includes an initial value determined at initialization of the monotonic counter, and an output value read from the monotonic counter subsequent to the initialization; at least one processor; and memory containing instructions configured to instruct the at least one processor to: generate the key; store the key in the non-volatile memory; initialize the monotonic counter to provide the initial value, wherein the initial value is associated with the stored key; send, to a computing device, a communication including the initial value for comparison to the output value to determine whether tampering with the system has occurred.

In one embodiment, the monotonic counter is configured to increment the counter value output on each power-on operation of the system and/or on each attempt to read the stored key.

In one embodiment, the instructions are further configured to instruct the at least one processor to: read a first counter value from the monotonic counter; determine that the first counter value exceeds a predetermined maximum value; and in response to determining that the first counter value exceeds the predetermined maximum value, permanently disable read access to the stored key.

In one embodiment, the computing device is configured to: read the output value from the monotonic counter; compare the output value to the initial value; and determine, based on comparing the output value to the initial value, an occurrence of tampering with the system.

In one embodiment, the computing device is further configured to determine a number of events that cause the monotonic counter to increment, and wherein comparing the output value to the initial value comprises adjusting the initial value based on the determined number of events.

In one embodiment, the instructions are further configured to instruct the at least one processor to: receive a communication from the computing device including an indication that tampering has been detected; and in response to receiving the communication including the indication that tampering has been detected, disable at least one function of the system.

In one embodiment, the system further comprises a semiconductor die including the non-volatile memory, the monotonic counter, and the at least one processor.

In one embodiment, the non-volatile memory is a non-volatile memory device, and the system further comprises a system board including the non-volatile memory device and the at least one processor.

In one embodiment, generating the key comprises using an output from at least one physical unclonable function to generate the key. In one embodiment, the key is generated for each power-on cycle of the system.

In one embodiment, the system further comprises a system board configured to store, in memory, an application executed by the at least one processor, and wherein execution of the application occurs after power-on of the system.

Figure 4:
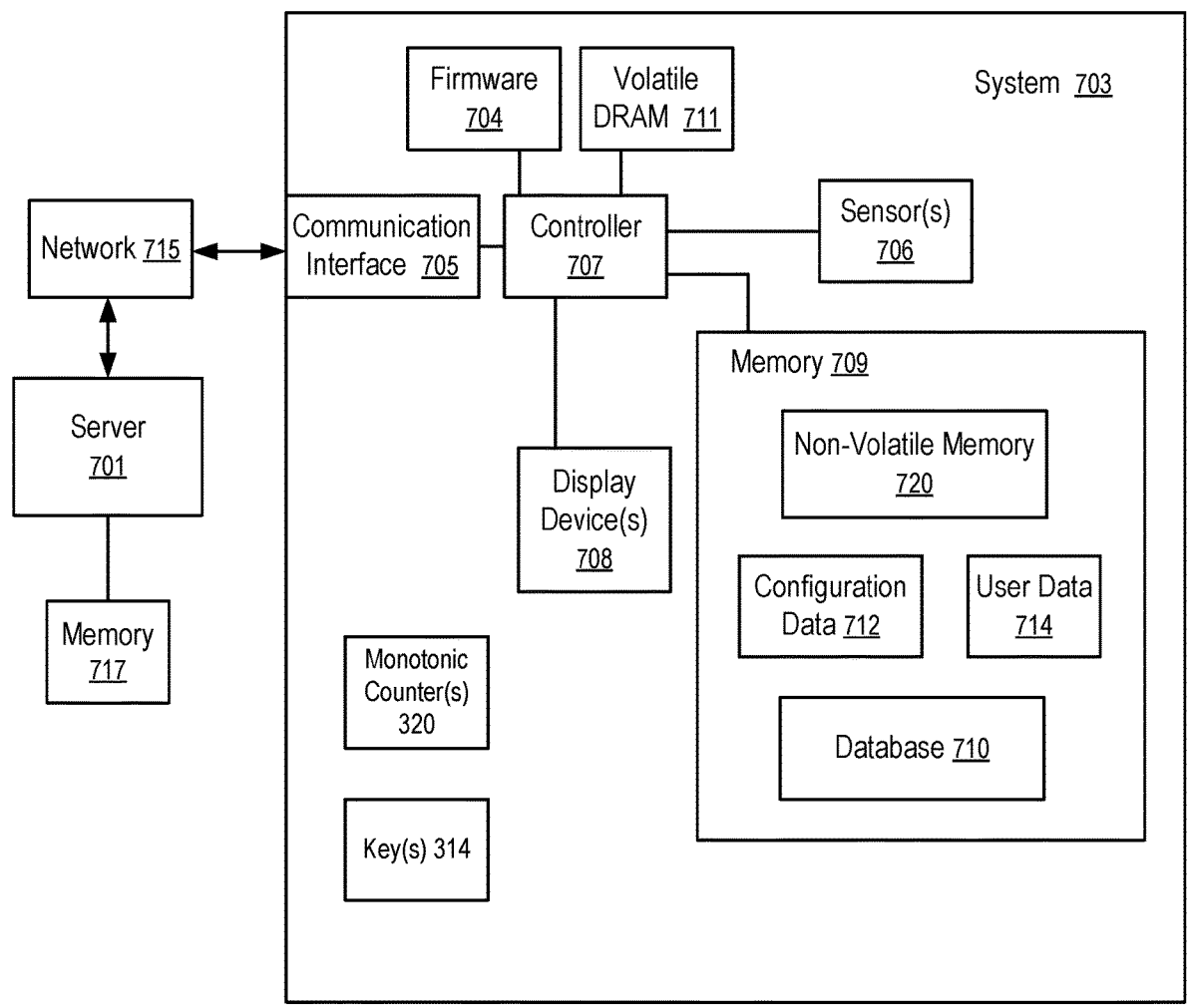
FIG. 4 shows a system storing one or more keys that communicates with a server over a communication interface, according to one embodiment.

FIG. 4 shows a system 703 storing one or more keys 314. System 703 communicates with a server 701 over a communication interface 705, according to one embodiment. For example, system 703 includes a communication interface 705 used to receive an OTA update for firmware (e.g., from a customer/end user). Communication amongst the system 703 and a server 701 can be performed over a network 715 (e.g., a wireless network). This communication is performed using communication interface 705. In addition, server 701 is coupled to memory 717. Controller 707 is coupled to firmware 704 and volatile DRAM 711.

In one embodiment, monotonic counters 320 are initialized to initial values respectively associated with each of keys 314. The keys 314 are stored in non-volatile memory 720. The initial values are sent to server 701, for use in comparison to subsequent counter values as was described above.

In one embodiment, the server 701 generates an authorization for usage of the system 703. The memory 709 of the system 703 stores user data 714. In one embodiment, the server 701 controls the loading of user data of a new user (e.g., a new end user/customer) into the memory 709 of the system.

A controller 707 controls one or more operations of the system 703. For example, controller 707 controls user data 714 stored in memory 709. Controller 707 also controls loading of user data into memory 709 and/or other memory of the system 703. Controller 707 also controls display of information on display device(s) 708. Sensor(s) 706 provide data regarding operation of the system 703. At least a portion of this operational data can be communicated to the server 701.

Memory 709 can further include, for example, configuration data 712 and/or database 710. Configuration data 712 can be, for example, data associated with operation of the system 703 as provided by the server 701. The configuration data 712 can be, for example, data that constrains operation of the system 703, for example based on conditions associated with a system.

Database 710 can store, for example, data collected by sensors 706. Database 710 also can store, for example, data provided by the server 701 in response to opening of a record regarding usage of the system 703 by a new end user/customer.

In one embodiment, when a system is being operated, data regarding activity of system 703 can be communicated to server 701. This activity may include operational aspects of the system 703.

In one embodiment, the server 701 sends a request to the system 703 for a status report and/or other data regarding the system 703. In response to the request, the server 701 receives the status report, and then the server 701 causes (e.g., by sending a communication to the system 703 based on data in the status report) the system 703 to configure user data 714 of the user in memory 709.

As illustrated in FIG. 4, controller 707 also may control the display of images on one or more display devices 708. Display device 708 can be a liquid crystal display. The controller 707 may receive data collected by one or more sensors 706. The sensors 706 may be, for example, mounted in the system 703. The sensors 706 may include, for example, a camera, a microphone, a motion detector, and/or a camera.

The sensors 706 may provide various types of data for collection by the controller 707. For example, the collected data may include image data from the camera and/or audio data from the microphone.

In one embodiment, the controller 707 analyzes the collected data from the sensors 706. The analysis of the collected data includes providing some or all of the collected data to server 701.

In one embodiment, memory 709 stores database 710, which may include data collected by sensors 706 and/or data received by communication interface 705 from a computing device, such as, for example, server 701. For example, this communication may be used to wirelessly transmit collected data from the sensors 706 to the server 701. The data received by the system may include configuration or other data used to configure control of the display devices 708 by controller 707.

Figure 5:
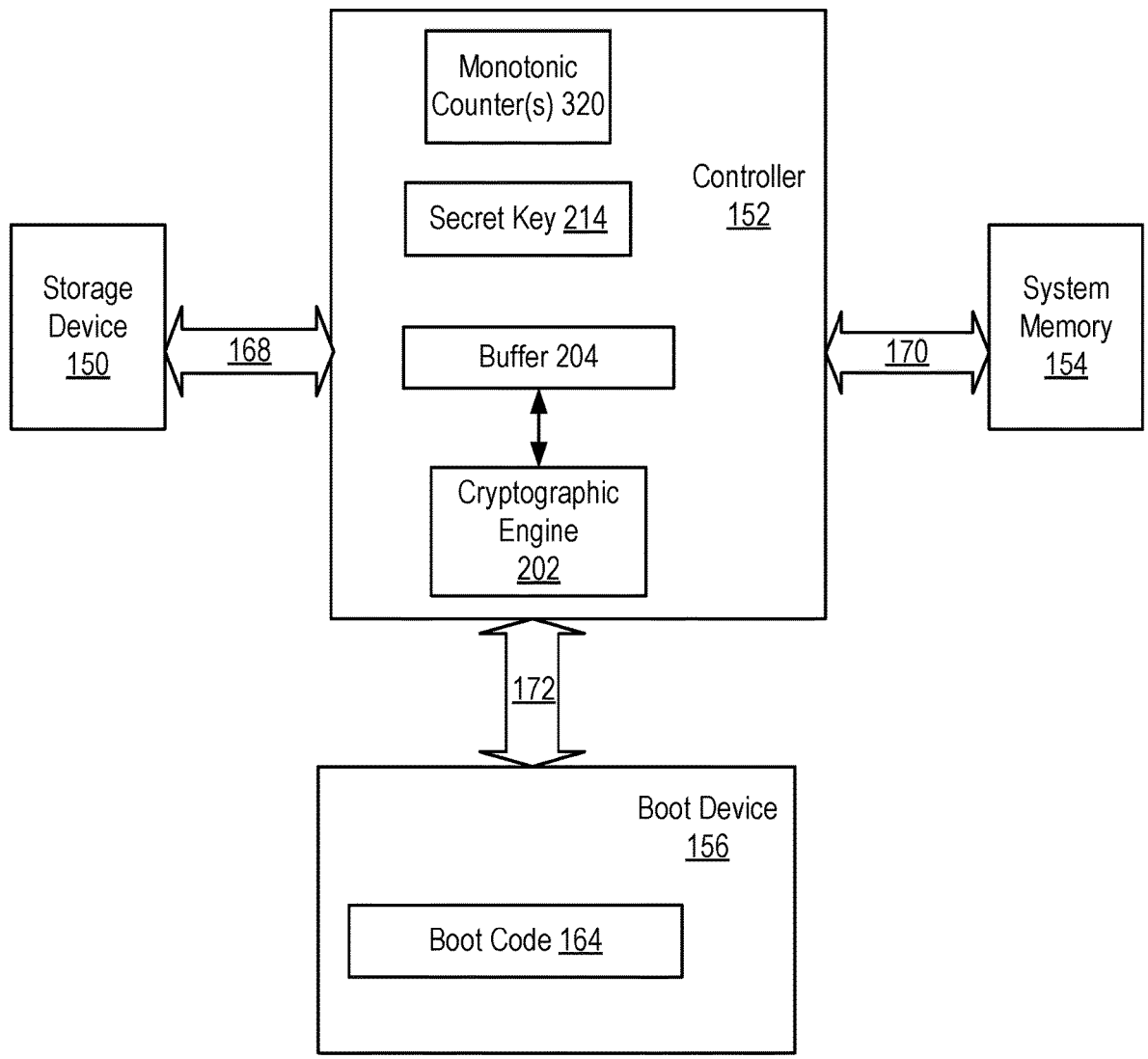
FIG. 5 shows a controller storing a secret key used for communication with a storage device and/or system memory, according to one embodiment.

FIG. 5 shows a controller 152 storing a secret key 214 used for communication with components (e.g., on a system board) including a storage device 150 and/or system memory 154, according to one embodiment. In one embodiment, controller 152 is used in a system for determining whether to accept or reject data (e.g., a portion of firmware or run-time code stored in a buffer 204 of application controller 152) based on comparing values from monotonic counters 320.

Data may be transferred between components of the system via interconnects 168, 170, 172, each of which may be, for example, an internal or external data or other bus (e.g., Peripheral Component Interconnect (PCI), PCI eXtended (PCI-X), PCI Express (PCIe)), a communication portion, and/or a computer network.

In one embodiment, one or more of storage device 150, application controller 152, and system memory 154 are portions of a system-on-chip (SOC) device (e.g., all of these components are on the same SOC chip). In one embodiment, boot device 156 may be included as part of the SOC chip. In other embodiments, each of these components may be implemented on separate chips (e.g., mounted on and connected by wiring on a hardware card or other structure).

In one example, application controller 152 is the main MCU running a system (e.g., INTEL core i7 is an application controller of a computer). Various controllers (e.g., memory controller) in the surrounding system serve application controller 152 to execute functions.

In one embodiment, firmware or run-time code is received, via application controller 152, by a local buffer from storage device 150 or system memory 154.

In one embodiment, stored data is received by the buffer 204 as a stream of data portions (e.g., a data portion can be one page, or a group of pages). A cryptographic engine 202 calculates a cryptographic measurement for each data portion received.

In one embodiment, the application controller 152, before reading and/or using data from boot device 156, verifies the identity of boot device 156 (e.g., to avoid a need for replacement of a boot device component). In this embodiment, the identity verification is based on using values from monotonic counters 320.

In one embodiment, application controller 152 makes a request for a new secure over-the-air update (e.g., from the same original source, or from a different source). In one embodiment, the over-the-air update is received from a computing device such as a server (e.g. host 101).

In one embodiment, the data received by buffer 204 is code obtained from storage device 150. In response to determining to accept the data, application controller 152 copies the data from buffer 204 to system memory 154.

In one embodiment, the memory used on boot device 156, storage device 150, and/or system memory 154 can be a non-volatile storage media (e.g., flash memory) and/or volatile memory. This memory may, for example, store boot code 164.

Variations

Various additional non-limiting embodiments are now described below. In one embodiment, a mechanism is provided to move keys from one location to another ensuring that the key is not read by a malicious attacker during the transportation of the device with the key. This mechanism uses key injection. For example, the key injection is performed by programming a key inside the device.

In one embodiment, trust for trusted platform modules (TPMs) is based on a secret key using one of the MTC counter value comparison methods above. For example, with a symmetric cryptography mechanism, a secret key is shared between two entities (e.g., Host 1 and Host 2). This can be, for example, the memory and a possessor that manages the memory.

In one embodiment, a symmetric key is shared between at least two entities. For example, Host 1 and Host 2 are the possessors that manage contents of a memory. Both of these processors can share the same secret key using the methods for monotonic counter value comparison described above.

In one example, symmetric keys are used to exchange messages. In this symmetric key approach, the entities know a password, code, etc., that permits them to communicate in a cryptographic way. The monotonic counter value comparison above provides a methodology that permits two entities to never meet in person, but permits Host 1 to communicate a key to Host 2 in a safe manner. If there is a third entity in the middle, like a transportation company, that tries to leak the key from the device, it will be detectable by Host 2 when the device with the stored key is received.

In one embodiment, the monotonic counter method above is generalized for use with other parties (and not just to share a secret key). For example, using a few monotonic counters (e.g., number 1, number 2, . . . number N) permits sharing more than one secret key. This enables other services, such as payments.

In one embodiment, the mechanism that is used to implement a service is based on counting a value. For example, the number of power cycles of the device. In that case, the mechanism will detect any attempt for a man-in-the-middle to use the device in an unauthorized manner. This is so because when the device leaves the first production plant and reaches the second production plant, if someone in the middle attempts to use the device, the counter value with respect to the destination is different from the one sent (after adjustment for known accesses). This mechanism permits detecting an attempt to read the key.

In one example, assume that entity one and entity two agree about two secret keys in the device. Each secret key has associated with it a monotonic counter (e.g., monotonic counter 1 and monotonic counter 2). When entity one tests the device, it stores the monotonic counter valued measured in the device (the initial value). Entity one will ship the device to entity two and separately send the initial value of the respective monotonic counter. If a man-in-the-middle tries to power-on the device or tries to send the command sequence to read the key, the monotonic counter will have been incremented by a second value that is associated to the number of attempts that are made and the number of power cycles the device has seen. When the device arrives at entity two, entity two will read back the monotonic counter value and compare it with the initial value delivered when the device left possession of entity one. If the two values are the same (after appropriate known event adjustment), this indicates that the device was not compromised. If the two values are different, this indicates that the device was, without authorization and/or knowledge, powered on or a key read was attempted, and thus the device content may be compromised.

In one embodiment, the initial value can be used as follows. For example, when testing the device, the device power will be turned on and off some number of times (e.g., 10 times). The monotonic counter internally will count up to 10, due to the fact that the power-on happened 10 times. In addition, suppose the customer reads the key an additional 2 times. The final value for the monotonic count for this key will be 12. When the device is sent, the value for monotonic counter associated with the secret key received by the recipient should be 12. The recipient will read the device. Adjusting by removing the recipient's power-on and key read operations means that the initial value as compared to the recipient's read value should be the same. This means that no entity in the middle was able to have known the device or was able to leak the secret. However, in the case that the recipient reads a value that is different from the value that the sender has sent (after the foregoing adjustment) means that an entity in the middle turned on the device or attempted to read the internal key.

In one embodiment, when the device is received, the recipient will issue the command sequence to read the monotonic counter. If there is only one secret key k, then for MTCk, k would be zero. The monotonic counter zero belongs to the unique key that is stored inside the device. When this value is read, it will return the value stored in the fabrication facility plus one, since reading the device will increment the MTC by one. If any number is read back that is larger than the initial value plus the number of known/recipient power-on and key read attempts, then the device is considered to be compromised.

In one embodiment, the above method can be implemented more generally at multiple customer levels with each vendor and subsequent customer being able to verify device integrity.

In one embodiment, the monotonic counter can be used both as a mechanism to ensure the key was not read by an unauthorized entity, and also as a mechanism to ensure payment for a service. For example, in a set-top-box application an end-user may be given access to a set of channels only three times. Each time the end-user powers-on the box, the MTC will increment by one. On the fourth and subsequent power-on the box will lock. The end-user would need to pay an additional fee to unlock the box. This can be used to allow customers to try a service before buying or to ensure they are paying for the service that is expected.

In one embodiment, when transferring a board implementing the method above, the MTC is first initialized with a value. The value can be arbitrary. The board and the initial value are transferred to the customer. The customer reads the MTC value, subtracts the number of power-on and key read cycles conducted at the customer site, and confirms the MTC value matches the initial value sent from the vendor. If these values match, the board was not compromised during transportation. If the values are different, the content of the device may have been compromised.

In one embodiment, the procedure above is similar for multiple keys, except that there will be at least one MTC for each key. If any one of the MTC values are different than what was communicated, then the code or other data is considered compromised and no longer usable.

In one embodiment, the methods above can be used for memory devices. For example, a CPU or controller with no special security function implemented could leverage the monotonic counter mechanism to determine if an entity was able to read firmware on a board or keys that can be located in other positions. For example, assume a complex board has a device that does not contain security installed in a module attached to the system. If the board contains the above MTC methods, then the MTC can be used to see determine if the board has been power cycled or operated via some other activity while not under the control of the owner or final user.

In one embodiment, the MTC methods above can be used to protect custom firmware. By counting the number of power-on cycles, a controller in a device can determine if the device has been powered-on more times than expected, indicating that custom firmware is potentially compromised. Closing In various embodiments, a non-transitory computer storage medium is used to store instructions of firmware in the systems above and/or firmware of other components. When the instructions are executed by a controller (e.g., an application controller, or a controller of a boot or storage device) or other computing device, the instructions cause the controller to perform any of the methods discussed herein.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
   non-volatile memory configured to store a key;
   a monotonic counter configured to provide a counter value output, wherein the counter value output includes an initial value determined at initialization of the monotonic counter, and an output value read from the monotonic counter subsequent to the initialization;
   at least one processor; and
   memory containing instructions configured to instruct the at least one processor to:
      generate the key;
      store the key in the non-volatile memory;
      initialize the monotonic counter to provide the initial value, wherein the initial value is associated with the stored key;
      send, to a computing device and prior to physical transport of the system, a communication including the initial value for comparison to the output value to determine whether tampering with the system has occurred, wherein the computing device is configured to:
         track a number of known events that cause the monotonic counter to increment;
         adjust the initial value based on the number of known events to provide an adjusted initial value; and
         subsequent to the physical transport, compare the output value to the adjusted initial value to determine whether the tampering has occurred.

2. The system of claim 1, wherein the monotonic counter is configured to increment the counter value output on each power-on operation of the system.

3. The system of claim 1, wherein the monotonic counter is configured to increment the counter value output on each attempt to read the stored key.

4. The system of claim 1, wherein the instructions are further configured to instruct the at least one processor to:
   read a first counter value from the monotonic counter;
   determine that the first counter value exceeds a predetermined maximum value; and
   in response to determining that the first counter value exceeds the predetermined maximum value, permanently disable read access to the stored key.

5. The system of claim 1, wherein the computing device is configured to:
   read, subsequent to the physical transport, the output value from the monotonic counter.

6. The system of claim 1, wherein the instructions are further configured to instruct the at least one processor to:
   receive a communication from the computing device including an indication that tampering has been detected; and
   in response to receiving the communication including the indication that tampering has been detected, disable at least one function of the system.

7. The system of claim 1, further comprising a semiconductor die including the non-volatile memory, the monotonic counter, and the at least one processor.

8. The system of claim 1, wherein the non-volatile memory is a non-volatile memory device, the system further comprising a system board including the non-volatile memory device and the at least one processor.

9. The system of claim 1, wherein generating the key comprises using an output from at least one physical unclonable function to generate the key.

10. The system of claim 9, wherein the key is generated for each power-on cycle of the system.

11. The system of claim 1, further comprising a system board configured to store, in memory, an application executed by the at least one processor, and wherein execution of the application occurs after power-on of the system.

12. A method comprising:
   storing a key in a non-volatile memory device of a system board;

initializing a monotonic counter to provide an initial value, wherein the initial value is associated with the stored key; and sending, to a computing device and prior to physical transport of the system board, a communication including the initial value, the initial value for comparison to an output value read from the monotonic counter subsequent to the initializing in order to determine whether tampering has occurred, wherein the computing device is configured to:

track a number of known events that cause the monotonic counter to increment;

adjust the initial value based on the number of known events to provide an adjusted initial value; and subsequent to the physical transport, compare the output value to the adjusted initial value to determine whether the tampering has occurred.

13. The method of claim 12, wherein the tampering is an unauthorized attempt to read the stored key.

14. The method of claim 12, further comprising, after sending the communication:

reading, by the computing device and subsequent to the physical transport, the output value from the monotonic counter;

comparing, by the computing device, the output value to the adjusted initial value; and based on comparing the output value to the adjusted initial value, determining, by the computing device, that the tampering has occurred.

15. The method of claim 12, further comprising counting, by the computing device, a number of read operations performed to access the stored key, wherein the known events include the number of read operations.

16. The method of claim 15, further comprising counting, by the computing device, a number of power-on operations performed, wherein the known events further include the number of power-on operations.

17. The method of claim 12, further comprising:

based on comparing the output value to the adjusted initial value, determining, by the computing device, an absence of tampering; and in response to determining the absence of tampering, reading the stored key.

\* \* \* \* \*